United States Patent Office.

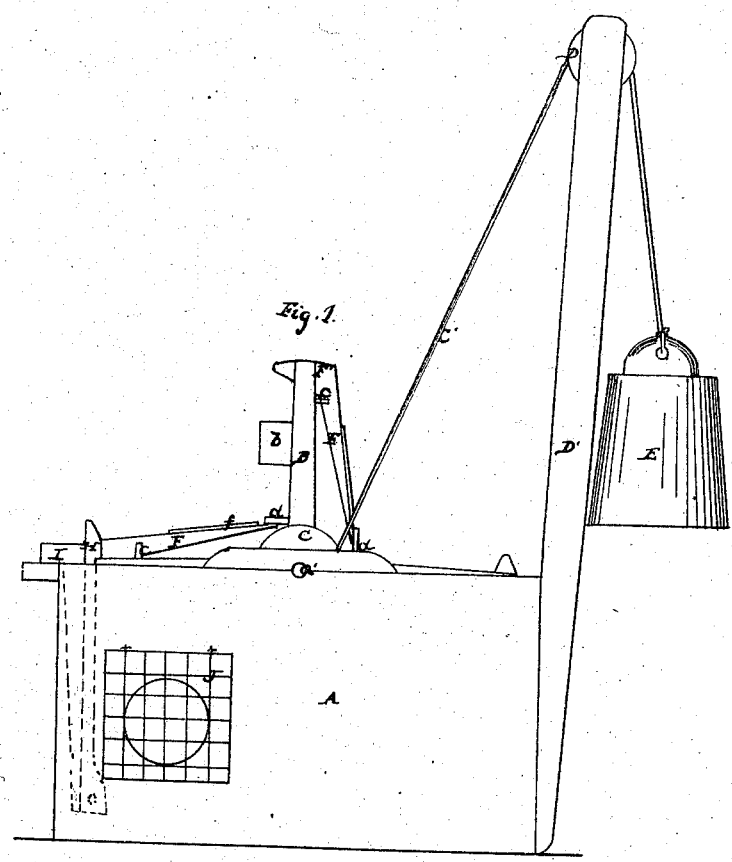
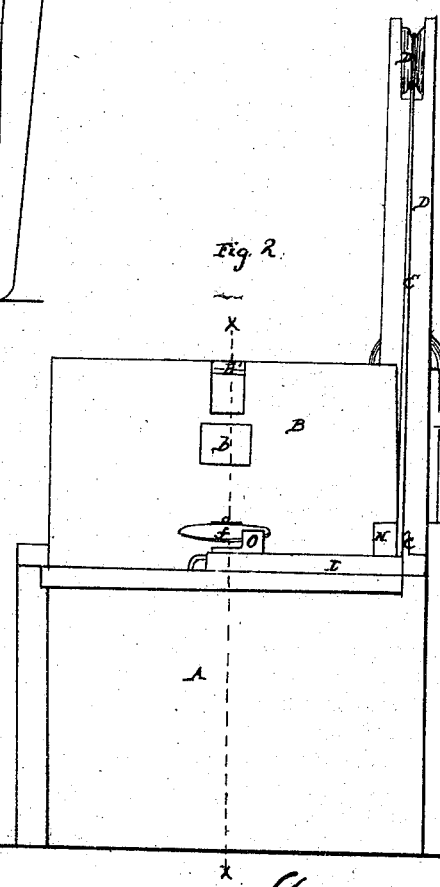
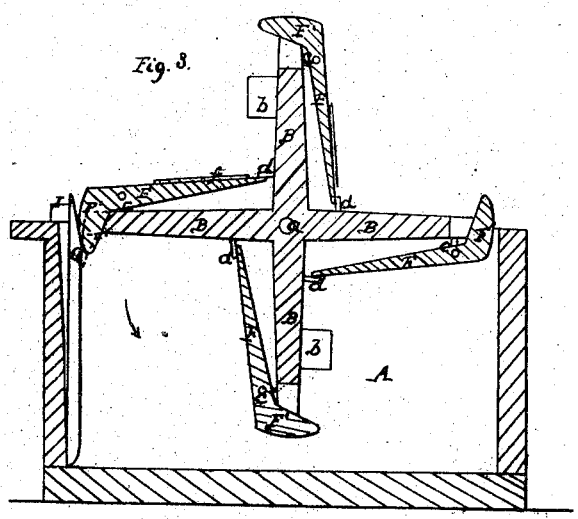

C. C. LYMAN, OF EDENBORO, PENNSYLVANIA.

Letters Patent No. 75,777, dated March 24, 1868.

---

IMPROVED ANIMAL-TRAP.

---

*The Schedule referred to in these Letters Patent and making part of the same.*

---

TO ALL WHOM IT MAY CONCERN:

Be it known that I, C. C. LYMAN, of Edenboro, in the county of Erie, and State of Pennsylvania, have invented certain new and useful Improvements in Animal-Traps; and I do hereby declare that the following is a full and complete description of the construction and operation of the same, reference being had to the accompanying drawings, making a part of this specification, in which—

Figure 1 is a side view.

Figure 2 is a front view.

Figure 3 is a vertical transverse section in the direction of the line $x\ x$, fig. 2.

Like letters of reference refer to like parts in the views.

My improvement relates to a trap so constructed and arranged that it is self-acting, and, after being sprung, setting itself again.

In the drawings, A represents the case or box of the trap, in which revolve, as hereinafter described, the wings B, which also form a cover or lid to the trap. These wings are supported on the shaft $a$, which has its bearings at $a'$ in the sides of the frame or box. On one end of this shaft is secured the pulley C. Over this pulley passes a cord, C', up to a pulley, D, in the end of the upright standard D', which is secured to the end of the frame, or some convenient place near the trap. To the end of this cord is attached a weight, E, the purpose of which will be hereafter described. The wings B, above referred to, four in number, are shown in fig. 3, two at a time serving for a lid to the trap, and also a platform on to which the animal comes for bait, which is represented at $b$. At one end of each of these wings is hung, at $c$, a lever, F, which lever is provided with a head, F', the other end extending along towards the next wing, and catching under a pin, $d$, as shown, each wing provided, as stated, with a lever and pin, $d$, the bait being secured above said lever on the wings, as at $b$, fig. 3. G is a catch, as is also H, fig. 1. I is an arm, which aids in operating the catches, as hereinafter described.

The operation of the trap is as follows: When it is first set, the lever F is in the position shown in fig. 3, the end thrown up against the pin $d$, with the bait $b$ above, as shown, the spring-catch being also as represented, coming under the edge of the wing or platform B, and the spring-catch H resting on the top of the same, as shown in fig. 1. As the animal comes up on to the platform for the bait, it must step on the lever to reach it, thus depressing the end of said lever, and which, when done, springs the trap in the following manner: By depressing this end of the lever, which is done by the animal stepping on it, as stated, the head F' of said lever is thrown out, which pushes against the catch G, and thus relieves the platform, which, by means of the weight E and cord C', attached to the pulley on the end of the shaft $a$, is thrown down in the direction of the arrow, thus dropping the animal in the box below, the wing next to this one taking the place of the one already dropped, and is set as follows: As the wing comes down, it strikes against the catch H, which in turn pushes the end of the arm I back, and as this end of the arm is thrown back, the other end of said arm is pushed forward against the catch G, which pushes against the head of the lever and turns it up in place, the catches G H holding said wing or platform B in place until relieved by the depression of the lever, which forces the catch G from under the platform, and the weight E draws it down. Thus, as soon as one animal is caught, the trap is set for another, and so on, the trap each time setting itself.

If wished, a small platform, $f$, can be placed on the lever on which the animal is to step.

This box or trap A is intended to be set in contact with another box, a spring-door, J, being hung over the opening, as shown. Animals when dropped down, as stated, into the box, can then pass through this door into the box adjoining.

What I claim as my improvement, and desire to secure by Letters Patent, is—

1. The revolving wings or platforms B, and levers F, pulley C, cord C', and weight E, arranged in the manner and for the purpose substantially as described.

2. The wings B with pivoted levers F, in combination with the spring-catch H, and catch G, arranged as and for the purpose substantially set forth.

C. C. LYMAN.

Witnesses:
W. H. BURRIDGE,
J. HOLMES.